(No Model.)
O. C. LITTLE.
BOLT.
No. 491,660.    Patented Feb. 14, 1893.
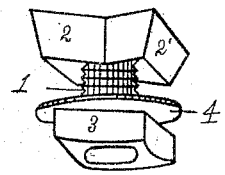
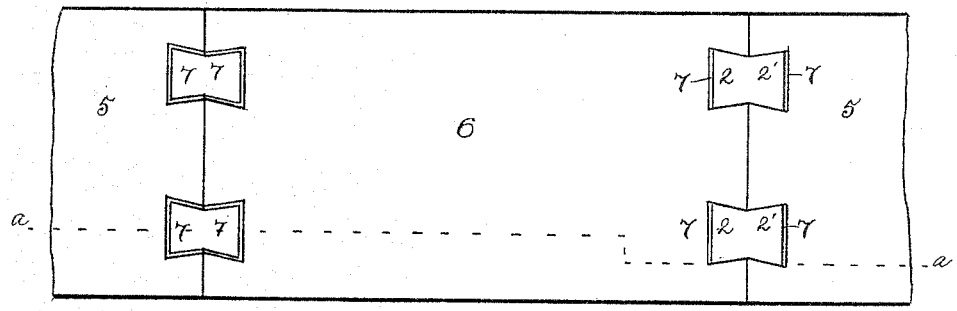
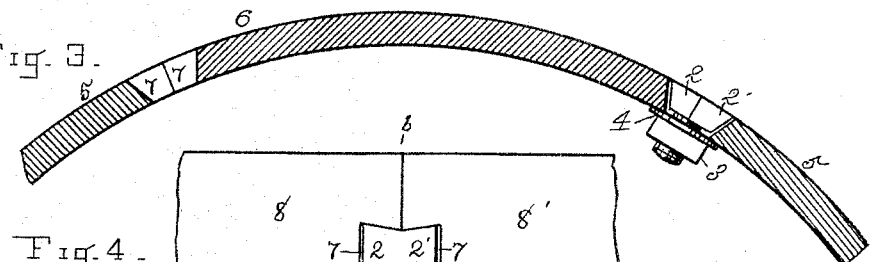
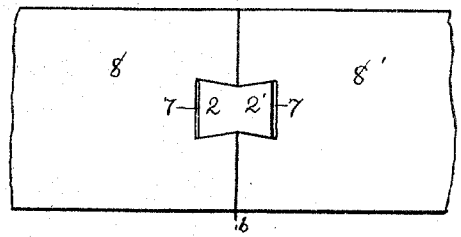
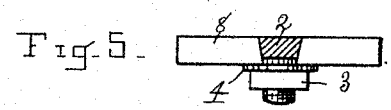
Witnesses
John Payne
J. E. Smith
Inventor
Orton C. Little.
By G. H. Albee
his Atty.

UNITED STATES PATENT OFFICE.

ORTON C. LITTLE, OF MENASHA, WISCONSIN, ASSIGNOR OF ONE-HALF TO DUNCAN T. H. MacKINNON, OF SAME PLACE.

BOLT.

SPECIFICATION forming part of Letters Patent No. 491,660, dated February 14, 1893.

Application filed September 23, 1892. Serial No. 446,700. (No model.)

*To all whom it may concern:*

Be it known that I, ORTON C. LITTLE, a citizen of the United States, residing at Menasha, in the county of Winnebago and State of Wisconsin, have invented a new and useful Improvement in Bolts, of which the following is a specification.

My invention relates to a bolt for connecting two pieces of any suitable material and form to each other, as two sections of a pulley rim, two plates of metal or two pieces of wood, and the object of my improvement is, to provide a bolt for connecting two pieces, such as are above described, and a bolt that will accomplish the result that two bolts have heretofore been required for. I attain these objects by means of the construction illustrated in the accompanying drawings, in which—

Figure 1 is a view in perspective of the bolt of my invention. Fig. 2, is a plan showing a part of a pulley rim face having a removable section therein, the left hand end of said rim face showing sockets in the meeting ends of the pulley rim sections and the right hand end showing my improved bolt applied to the rim and connecting one section to the other. Fig. 3 shows said pulley rim in section upon the line *a, a,* of Fig. 2. Fig. 4 is a plan of two plates, or bars, connected end to end with my improved bolt and Fig. 5, an end view of one of said bars, at the line *b, b,* of Fig. 4, the bolt head being cut by said line and is in section.

Similar figures of reference indicate like parts in the several views.

1, indicates the shank of the bolt; 2 and 2', the two dove-tail portions of its head; 3, a nut upon the shank 1; 4, a washer upon the bolt; 5, the ends of the larger portion of a pulley rim; 6, a removable section of said pulley rim; 7, dove-tail shaped sockets in each end of the pieces to be connected for receiving the dove-tail shaped ends of the bolt head. 8, 8', plates or bars.

The bolt may be made by any of the usual methods, or processes, as by forging with a hammer, by the drop forging process, or by casting, and any suitable material may be used for its construction. It consists of a shank and head, the head containing the essential feature of my invention. The head consists of two dove-tail parts, or wings, 2 and 2', connected together at the narrowest part of said dove-tails, and each of said wings having their outer edges inclined inward from their top to the bottom side of the bolt head; whereby, although the bolt head sockets in the two pieces which are to be bolted together are entirely through said pieces and are of nearly the size of the bottom side of the bolt head, said bolt head cannot be drawn through said two pieces by the screwing up of the nut upon the bolt, but the two pieces will, in consequence of the inclination of the edges of the dove-tail wings of the bolt head be drawn endwise toward each other until the meeting of the ends of said pieces stop their farther movement.

The bolt has been described as having all of the edges of its head inclined inward from its top to its bottom side. This is essential with reference to the two opposite sides of the dove-tail wings, but is not so with reference to its ends. The wide end of the dove-tail, or the ends of the bolt head, may be of nearly any form which fancy may dictate, or its purpose make desirable, and not impair the efficiency of the bolt for connecting two pieces of suitable form to each other.

This bolt is particularly adapted for connecting the two parts of the rim of an iron, separable pulley, as is shown in Figs. 2 and 3, but may be applied for connecting two plates of metal, or pieces of wood, when such articles are to be connected, one edge to another, as herewith shown. The sides of the sockets 7, in the ends of the pulley rim sections and plates or bars, from the outer to the inner surface thereof, should be inclined toward each other at an angle corresponding with that upon the edges of the bolt head sides, for the purpose of lessening the friction and obtaining greater power in drawing the two sections of the pulley rim, plates or bars, toward each other.

One bolt applied as here illustrated, performs the same duty that two bolts as they are usually applied for connecting the sections of a pulley rim have heretofore done. The usual method of connecting the sections of a separable pulley has been to employ two bolts and a strip of iron, or a lug cast upon one section of the rim, for a connecting piece.

With my improvement the strip of iron or lug, and one bolt, are dispensed with, a single bolt being as efficient as two of the former and its connecting piece.

Having described my invention, what I claim and desire to secure by Letters Patent, is—

1. As a new article of manufacture, a bolt, consisting of a shank having a head at one end and being adapted to have a nut fitted upon the other end, the head consisting of two wings and being of approximately the form of two dove-tails meeting each other at their narrowest ends, the side edges of said dove-tail shaped wings being inclined toward each other, from the top to the bottom side of the bolt head, substantially as described.

2. A device for connecting two sections of a separable pulley rim, or two plates, or bars, by the edges thereof, consisting of a shank having a nut screwed thereon, and a head having two wings of approximately the form of two dove tails meeting each other at their narrowest ends, the side edges of said dove-tail shaped wings being inclined toward each other from the top to the bottom side of the bolt head, in combination with said pulley rim sections, bars or plates, having sockets formed in the meeting edges thereof, said sockets having their sides inclined with a corresponding inclination of the side edges aforesaid of the wings of the bolt head, substantially as described.

ORTON C. LITTLE.

Witnesses:
JOHN PAYNE,
J. E. SMITH.